United States Patent
Colson et al.

(10) Patent No.: US 10,666,449 B2
(45) Date of Patent: May 26, 2020

(54) ARRANGEMENT FOR CATV NETWORK

(71) Applicant: Teleste Oyj, Littoinen (FI)

(72) Inventors: Carlos Colson, Antwerp (BE); Kari Mäki, Turku (FI); Sami Halen, Kaarina (FI)

(73) Assignee: Teleste Oyj, Littoinen (FI)

(*) Notice: Subject to any disclaimer, the term of this patent is extended or adjusted under 35 U.S.C. 154(b) by 0 days.

(21) Appl. No.: 16/158,349

(22) Filed: Oct. 12, 2018

(65) Prior Publication Data
US 2019/0116057 A1    Apr. 18, 2019

(30) Foreign Application Priority Data

Oct. 13, 2017 (EP) .................................... 17397524

(51) Int. Cl.
*H04N 7/173*    (2011.01)
*H04L 12/28*    (2006.01)
(Continued)

(52) U.S. Cl.
CPC ......... *H04L 12/2801* (2013.01); *H04N 7/102* (2013.01); *H04N 21/6118* (2013.01); *H04N 21/6168* (2013.01); *H04B 10/25751* (2013.01)

(58) Field of Classification Search
CPC . H04N 21/6118; H04N 21/6168; H04N 21/63
See application file for complete search history.

(56) References Cited

U.S. PATENT DOCUMENTS

| 4,983,927 A * | 1/1991 | Torazzina | H03G 3/348 330/267 |
| H001858 H * | 9/2000 | Ibelings | 725/121 |

(Continued)

FOREIGN PATENT DOCUMENTS

| WO | 2016156978 A1 | 10/2016 | |
| WO | WO-2016156978 A1 * | 10/2016 | ............... H04B 1/00 |
| WO | 2017065759 A1 | 4/2017 | |

OTHER PUBLICATIONS

Search report of the European Patent Application No. 17397524.4 issued by European Patent Office dated Apr. 9, 2018.

*Primary Examiner* — Gigi L Dubasky
(74) *Attorney, Agent, or Firm* — Berggren LLP

(57) ABSTRACT

A network element of a cable television (CATV) network, comprising an input for signal transmission; at least two diplex filters configured to be connected to said input, a first diplex filter comprising bandpass filters for a first upstream and downstream frequency bands and a second diplex filter comprising bandpass filters for a second upstream and downstream frequency bands, wherein an upper frequency edge of the second upstream frequency band is higher than an upper frequency edge of the first upstream frequency band and higher than or equal to a lower frequency edge of the first downstream frequency band and a lower frequency edge of the second downstream frequency band is higher than the upper frequency edge of the second upstream frequency band; a control circuit for measuring energy of radio frequency signals below said second downstream frequency band; and a switch for connecting one of said at least two diplex filters to said input, wherein said control circuit is configured to control the switch to connect the first diplex filter to said input in response to the energy of radio frequency signals below said second downstream frequency band exceeding a threshold value; or connect the second diplex filter to said input in response to the energy of radio frequency signals below said second downstream frequency band at most reaching the threshold value.

6 Claims, 2 Drawing Sheets

(51) Int. Cl.
*H04N 7/10* (2006.01)
*H04N 21/61* (2011.01)
*H04B 10/2575* (2013.01)

(56) References Cited

U.S. PATENT DOCUMENTS

| | | | |
|---|---|---|---|
| 2008/0313694 A1* | 12/2008 | Kudo | H04N 7/102 |
| | | | 725/131 |
| 2009/0113511 A1* | 4/2009 | Lee | H04B 10/2507 |
| | | | 725/129 |
| 2010/0251314 A1 | 9/2010 | Olson | |
| 2010/0251320 A1 | 9/2010 | Shafer | |
| 2011/0085586 A1* | 4/2011 | Kelma | H04N 7/10 |
| | | | 375/219 |
| 2017/0237450 A1* | 8/2017 | Knutson | H04B 1/0057 |
| | | | 370/297 |

* cited by examiner

ARRANGEMENT FOR CATV NETWORK

PRIORITY

This application claims priority of EP application No. 17397524.4, filed on 13 Oct. 2017 the content of which is incorporated herein by reference.

FIELD OF THE INVENTION

The invention relates to cable television (CATV) networks, and especially to an arrangement for adjusting frequency bands.

BACKGROUND OF THE INVENTION

CATV networks may be implemented with various techniques and network topologies, but currently most cable television networks are implemented as so-called HFC networks (Hybrid Fiber Coax), i.e. as combinations of a fibre network and a coaxial cable network. Data Over Cable Service Interface Specification (DOCSIS) is a CATV standard providing specifications for high-bandwidth data transfer in an existing CATV system. The latest version DOCSIS 3.1 enables the cable network operators to maximize both the downstream and upstream data throughput using the existing HFC networks.

The introduction of DOCSIS 3.1 raises the need to eventually adjust the frequency range and the bandwidth of the communication channels. The cable operators are willing to offer higher data rates for the upstream channels, and therefore they eventually will shift to use a higher upstream bandwidth supported by DOCSIS 3.1.

The upper frequency edge of the upstream bandwidth is controlled by diplex filters residing in network elements. Instead of maintenance personnel manually replacing the old diplex filters with new ones at each network element, it has been proposed that the network elements are provided with at least two diplex filters and the network elements are remotely controlled by a headend of the CATV network to select an appropriate diplex filter. However, there are a great number of CATV networks that do not support any kind of remote signalling.

BRIEF SUMMARY OF THE INVENTION

Now, an improved arrangement has been developed to reduce the above-mentioned problems. As aspects of the invention, we present a network element of a cable television network, which is characterized in what will be presented in the independent claims.

The dependent claims disclose advantageous embodiments of the invention.

According to an aspect of the invention, there is provided a network element of a cable television (CATV) network, said network element comprising an input for signal transmission; at least two diplex filters configured to be connected to said input, a first diplex filter comprising bandpass filters for a first upstream and downstream frequency bands and a second diplex filter comprising bandpass filters for a second upstream and downstream frequency bands, wherein an upper frequency edge of the second upstream frequency band is higher than an upper frequency edge of the first upstream frequency band and higher than or equal to a lower frequency edge of the first downstream frequency band and a lower frequency edge of the second downstream frequency band is higher than the upper frequency edge of the second upstream frequency band; a control circuit for measuring energy of radio frequency signals below said second downstream frequency band; and a switch for connecting one of said at least two diplex filters to said input, wherein said control circuit is configured to control the switch to connect the first diplex filter to said input in response to the energy of radio frequency signals below said second downstream frequency band exceeding a threshold value; or connect the second diplex filter to said input in response to the energy of radio frequency signals below said second downstream frequency band at most reaching the threshold value.

According to an embodiment, the upper frequency edge of the first upstream frequency band is 42 or 65 or 85 MHz and the upper frequency edge of the second higher upstream frequency band is at least one of 85 MHz, 117 MHz or 204 MHz.

According to an embodiment, the energy of radio frequency signals is configured to be measured at a frequency band between a lower frequency edge of the first downstream frequency band and the lower frequency edge of the second downstream frequency band, or a sub-band thereof.

According to an embodiment, the control circuit comprises a bandpass filter for a frequency band of 100-258 MHz, or a sub-band thereof.

According to an embodiment, the network element further comprises a directional coupler connected between said input and said at least two diplex filters, wherein the control circuit is configured to measure the energy of radio frequency signals below said second downstream frequency band at said directional coupler.

According to an embodiment, the control circuit is configured to turn off amplification of the upstream signals in the network element.

According to an embodiment, the control circuit is configured to turn off said amplification or switch off the upstream signals for a first predetermined period.

According to an embodiment, the control circuit is configured to turn off said amplification upon booting of the network element, and optionally repeatedly after a second predetermined period.

These and other aspects, embodiments and advantages will be presented later in the detailed description of the invention.

BRIEF DESCRIPTION OF THE DRAWINGS

The invention will now be described in more detail in connection with preferred embodiments with reference to the appended drawings, in which.

DETAILED DESCRIPTION OF THE EMBODIMENTS

Figure 1:
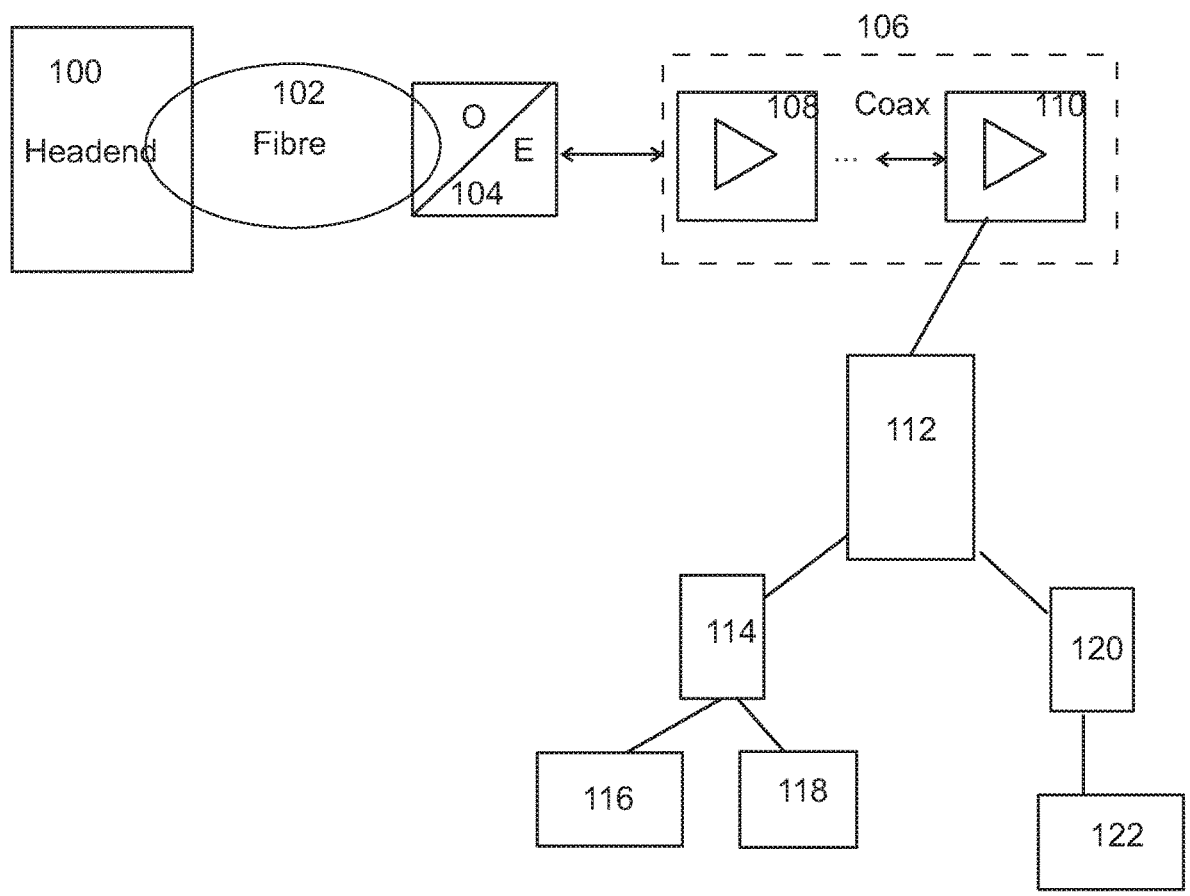
FIG. 1 shows the general structure of a typical HFC network.

FIG. 1 shows the general structure of a typical HFC network. Program services are introduced from the main amplifier 100 (a so-called headend) of the network via an optical fibre network 102 to a fibre node 104, which converts the optical signal to an electric signal to be relayed further in a coaxial cable network 106. Depending on the length, branching, topology, etc. of the coaxial cable network, this coaxial cable segment typically comprises one or more broadband amplifiers 108, 110 for amplifying program service signals in a heavily attenuating coaxial media. From the amplifier the program service signals are introduced to a cable network 112 of a smaller area, such as a distribution network of an apartment building, which are typically implemented as coaxial tree or star networks comprising signal splitters for distributing the program service signals to each customer. The cable network 112, such as the distribution network of an apartment, may further comprise a Network Interface Unit (NIU) arranged to divide downstream signals to appropriate home appliances. The NIU may operate as a home amplifier. From a wall outlet the signal is further relayed either via a cable modem 114 to a television receiver 116 or a computer 118, or via a so-called set-top box 120 to a television receiver 122.

Data Over Cable Service Interface Specification (DOCSIS) is a CATV standard providing specifications for high-bandwidth data transfer in an existing CATV system. DOCSIS may be employed to provide Internet access over existing hybrid fiber-coaxial (HFC) infrastructure of cable television operators. DOCSIS has been evolved through versions 1.0, 1.1, 2.0 and 3.0 to the latest version of 3.1. DOCSIS provides a lucrative option for cable network providers to maximize both the downstream and upstream data throughput using the existing cable TV network, but without making expensive changes to the HFC network infrastructure.

When implementing the HFC network of FIG. 1 according to DOCSIS, the headend 100 of the CATV network comprises inputs for signals, such as TV signals and IP signals, a television signal modulator and a cable modem termination system (CMTS). The CMTS provides high-speed data services to customers thorough cable modems (CM; 114) locating in homes. The CMTS forms the interface to the IP-based network over the Internet. It modulates the data from the Internet for downstream transmission to homes and receives the upstream data from homes. The CMTS additionally manages the load balancing, error correction parameters and the class of service (CoS).

Signals from the headend 100 are distributed optically (fiber network 102) to within the vicinity of individual homes, where the optical signals are converted to electrical signals at the terminating points 104. The electrical signals are then distributed to the various homes via the existing 75 ohm coaxial cables 106. The maximum data transfer of the coaxial cables is limited due to strong frequency-based attenuation. Therefore, the electrical signals transmitted over coaxial cables must be amplified. The amplifiers 108, 110 used for this purpose are suited to a specific frequency range. In addition, the upstream and downstream must occur over the same physical connection. The last part 112 of the coaxial connection between the CMTS and the CMs branches off in a star or a tree structure. A CMTS transmits the same data to all CMs located along the same section of cable (one-to-many communications). A request/grant mechanism exists between the CMTS and the CMs, meaning that a CM needing to transmit data must first send a request to the CMTS, after which it can transmit at the time assigned to it.

Depending on the version of DOCSIS used in the CATV network, there is a great variety in options available for configuring the network. For the downstream channel width, all versions of DOCSIS earlier than 3.1 use either 6 MHz channels (e.g. North America) or 8 MHz channels (so-called "EuroDOCSIS"). However, the upstream channel width may vary between 200 kHz and 3.2 MHz (versions 1.0/1.1), and even to 6.4 MHz (version 2.0). 64-QAM or 256-QAM modulation is used for downstream data in all versions, but upstream data uses QPSK or 16-level QAM (16-QAM) for DOCSIS 1.x, while QPSK, 8-QAM, 16-QAM, 32-QAM, 64-QAM and 128-QAM are used for DOCSIS 2.0 & 3.0.

DOCSIS 3.1 specifications support capacities of at least 10 Gbit/s downstream and 1 Gbit/s upstream using 4096 QAM. DOCSIS 3.1 rejects the 6 or 8 MHz wide channel spacing and uses narrower orthogonal frequency-division multiplexing (OFDM) subcarriers being 20 kHz to 50 kHz wide, which sub-carriers can be combined within a block spectrum of about 200 MHz wide.

DOCSIS 3.1 further provides the concept of Distributed CCAP Architecture (DCA). Converged Cable Access Platform (CCAP) may be defined as an access-side networking element or set of elements that combines the functionality of a CMTS with that of an Edge QAM (i.e. the modulation), providing high-density services to cable subscribers. Conventionally, the CCAP functionalities have been implemented in the headend/hub, such as the headend 100 in FIG. 1. In a DCA, some features of the CCAP are distributed from headend/hub to the network elements closer to the customers, for example to the fibre nodes 104 in FIG. 1. DOCSIS 3.1 specifies at least two network element concepts, i.e. a Remote PHY Device (RPD) and a Remote-MACPHY Device (RMD), to which some functionalities of the headend can be distributed. Thus, the term "headend" may refer to the conventional integrated headend/hub comprising all or a subset of the CCAP functionalities. The term "headend" may refer to a remote unit of a DCA, such as the RPD or the RMD, arranged to carry out at least a part of the CCAP functionalities. It is also possible that all CCAP functionalities are distributed to the remote node. It is noted that a CATV network may comprise several headends. There may be a central headend and one or more regional or sub-headends.

The data transmission between the distributed parts of the CCAP is typically carried out through a fiber connection. This may provide both scale advantages and flexible deployment options by maximizing the channel capacity and simplifying many operations via the usage of digital fiber and Ethernet transport.

While the implementation of DOCSIS 3.1 may provide many advantages in improving the channel capacity and the efficiency of the CATV networks, the fact is that the existing HFC network structures of the cable operators will be updated slowly and a great deal of the existing network elements will remain in use for a long time.

One issue relating to the introduction of DOCSIS 3.1 is the need to eventually adjust the frequency range and the bandwidth of the communication channels. The cable operators are willing to offer higher data rates for the upstream channels, and therefore they eventually will adjust the upstream bandwidth from 5-42 MHz (in Americas) or 5-65 MHz (in Europe) to a higher upstream bandwidth supported by DOCSIS 3.1. It is not mandatory to adjust, for example, the upper frequency edge of the upstream bandwidth immediately upon the introduction of DOCSIS 3.1, but in order to take full advantage of the improved channel capacity and efficiency the cable operators most probably are willing to take the maximum upstream bandwidth in use as soon as possible.

The increase in the upstream bandwidth means that the downstream bandwidth must be correspondingly decreased. The upper frequency edge of the upstream bandwidth and the lower frequency edge of the downstream bandwidth are controlled by diplex filters residing in network elements between the headend or the CMTS and the cable modems or other home premise devices. Network elements typically comprising such diplex filters include at least optical nodes and amplifiers. Regarding the existing network elements in the HFC networks, adjusting the frequency range and the bandwidth of the communication channels needs to be carried out manually. In other words, maintenance personnel needs to travel to each network element on the signal path, remove the old diplex filter and replace it with a new diplex filter. Hence, the replacement process, as such, is very slow and cumbersome.

Since the downstream signals pass the same diplex filters, there is a service breakdown both to and from each customer device locating along the downstream direction of the signal path for the time of the replacement. Considering the number of network elements comprising diplex filters along the signal path, each customer device may easily experience 10-20 service breakdowns due to the replacement of diplex filters.

In addition to network elements locating in the CATV network and maintained by a CATV operator, the signal path may further comprise NIUs, which are typically not maintained by the CATV operator, but rather privately owned network devices. Nevertheless, NIUs confront the same problems of switching the diplex filters as the optical nodes and amplifiers in the operator network.

Instead of a technician manually replacing the old diplex filters with new ones at each network element, it has been proposed that the network elements are provided with at least two diplex filters and the network elements are remotely controlled by a headend of the CATV network to select an appropriate diplex filter. Herein, either uni-directional proprietary control signaling from the headend or bi-directional control signaling using modems in accordance with DOCSIS or HMS (Hybrid Management Sublayer) standard or proprietary modems could be used. However, there are a great number of CATV networks that do not support any kind of remote signalling.

Therefore, an improved procedure is needed for adjusting the bandwidth of the communication channels in CATV networks.

According to an aspect, a network element of a cable television (CATV) network is now introduced, said network element comprising an input for signal transmission; at least two diplex filters configured to be connected to said input, a first diplex filter comprising bandpass filters for a first upstream and downstream frequency bands and a second diplex filter comprising bandpass filters for a second upstream and downstream frequency bands, wherein an upper frequency edge of the second upstream frequency band is higher than an upper frequency edge of the first upstream frequency band and higher than or equal to a lower frequency edge of the first downstream frequency band and a lower frequency edge of the second downstream frequency band is higher than the upper frequency edge of the second upstream frequency band; a control circuit for measuring energy of radio frequency signals below said second downstream frequency band; and a switch for connecting one of said at least two diplex filters to said input, wherein said control circuit is configured to control the switch to connect the first diplex filter to said input in response to the energy of radio frequency signals below said second downstream frequency band exceeding a threshold value; or connect the second diplex filter to said input in response to the energy of radio frequency signals below said second downstream frequency band at most reaching the threshold value.

It is noted that the bandpass filters for the upstream frequency bands herein may practically be lowpass filters allowing upstream signals having frequency between 0 Hz and an upper frequency edge of the upstream frequency band pass the filter. However, other constraints of the CATV networks practically raise the lower frequency edge of the upstream frequency band above 0 Hz, for example to 5 MHz. Similarly, the bandpass filters for the downstream frequency bands may be highpass filters allowing upstream signals having frequency over the lower frequency edge of the downstream frequency band pass the filter.

Thus, while anticipating the introduction of DOCSIS 3.1, the existing or the newly updated network elements may be provided with at least two diplex filters, wherein at least one diplex filter comprises a bandpass filter for a first frequency band, i.e. the old or the existing frequency band, and at least another diplex filter comprises a bandpass filter for a second upstream frequency band, i.e. the new frequency band according to DOCSIS 3.1. The network element may be provided with a switch or a corresponding logic for selecting the diplex filter to be used and for connecting the selected diplex filter to the input such that the upstream signal path travels through the selected filter. The network element further comprises a control circuit for measuring energy of radio frequency signals below said second downstream frequency band.

In various CATV systems, such as CATV systems according to DOCSIS specifications, it is either mandatory or at least preferable that there is a gap of frequency band, a.k.a. crossover band, between the upstream frequency band and the downstream frequency band; in other words, the upper frequency edge of the upstream frequency band and the lower frequency edge of the downstream frequency band do not overlap.

Accordingly, detecting sufficient amount of energy of radio frequency signals on frequencies below said second downstream frequency band indicates that the frequencies below said second downstream frequency band, at least on said crossover band and most likely on the second upstream frequency band, are used for downstream signal transmission. Accordingly, the second (higher) upstream frequency band cannot be used and consequently the first diplex is connected or remained to be connected to the input. On the other hand, if no or little energy of radio frequency signals is detected on frequencies below said second downstream frequency band, said frequencies are not used for downstream signal transmission, and the second diplex filter providing the second higher upstream frequency band is connected to the input.

The threshold value for measuring the energy of radio frequency signals and thereby detecting the existence of downstream signal transmission may vary depending on the configuration of the network and the number of channels. The signal level of a digital CATV channel may typically vary between 54-77 dBµV. On the other hand, the total number of channels may typically vary between 1-20. To provide sufficient safe margin for the detection, the threshold value may be, for example, 45 dBµV.

Accordingly, the service breakdowns experienced by the customer devices can be minimized, or possibly totally avoided. Since the process is automated to be carried out network element, the costs and delays relating to the work needed to adjust the frequency range and the bandwidth of the communication channels are avoided.

According to an embodiment, the upper frequency edge of the first upstream frequency band is 42 MHz, 65 MHz or 85 MHz and the upper frequency edge of the second higher upstream frequency band is at least one of 85 MHz, 117 MHz or 204 MHz. Thus, the network element comprises the first diplex filter arranged to operate the upstream channels within the existing frequency band (5-42 MHz typically in Americas, 5-65 MHz in Europe). The network element also comprises at least one, possibly several further diplex filters arranged to operate the upstream channels within any of the higher frequency bands supported in the DOCSIS 3.1 specification. Hence, the network element may comprise a second diplex filter arranged to operate the upstream channels within the frequency band below 85 MHz, a third diplex filter arranged to operate the upstream channels within the frequency band below 117 MHz, and a fourth diplex filter arranged to operate the upstream channels within the frequency band below 204 MHz. It is also possible that network element is initially operated at the lowest (85 MHz) upstream frequency band supported in the DOCSIS 3.1 specification, and adjusting to a higher (117/204 MHz) upstream frequency band supported in the DOCSIS 3.1 specification is anticipated. The switch or the corresponding logic may be then controlled to select one of the available diplex filters.

According to an embodiment, the energy of radio frequency signals is configured to be measured at a frequency band between a lower frequency edge of the first downstream frequency band and the lower frequency edge of the second downstream frequency band, or a sub-band thereof. Practically in most cases, it is sufficient to measure the energy of radio frequency signals between the lower frequency edge of the first downstream frequency band and the lower frequency edge of the second downstream frequency band; if there is detected downstream transmission, it indicates that the second upstream frequency band cannot be used.

According to an embodiment, the control circuit comprises a bandpass filter for a frequency band of 100-258 MHz or a sub-band thereof. Depending on the used first upstream frequency band and considering an intermediate frequency band to be left as a guard band before the downstream frequency band, the frequency band for the measurement may be adjusted accordingly.

For example, if the first upstream frequency band reaches to 65 MHz, a reasonable guard band may be left and start the measurement at 100 MHz and above. On the other hand, according to DOCSIS 3.1, if the second upstream frequency band reaches 204 MHz, then a crossover band of 204-258 MHz shall be left, and the second downstream frequency band starts at 258 MHz. Using the bandpass filter for a frequency band of 100-258 MHz or a sub-band thereof in the control circuit improves the reliability of the energy detection by filtering low frequency signals, which could possible cause false detections about existing RF energy.

It is noted that the frequency bands may also be different than what is stated above. It is known that some existing HFC network have been implemented as having upper frequency edge of the first upstream frequency band as 50 or 55 Mhz, for example. Moreover, when the standards evolve in the future, the upper frequency edge of the second upstream frequency band may differ from those stated in the current DOCSIS 3.1 specification.

On the other hand, even the current DOCSIS 3.1 specification at least theoretically enables a situation where the upper frequency edge of the first upstream frequency band is 65 MHz and the lower frequency edge of the first downstream frequency band is 85 MHz. Then the upper frequency edge of the second upstream frequency band could be 85 MHz (i.e. equal to the lower frequency edge of the first downstream frequency band) and the lower frequency edge of the second downstream frequency band could be 105 MHz. Thus, the energy measurement would be carried out on the crossover band 85-105 Mhz of the second diplex filter, wherein it would be advantageous to provide the control circuit with a bandpass filter having a frequency band starting from 85 MHz.

While the above-described procedure for adjusting the use of diplex filters is advantageous in terms of simplicity and automation, it is not irrelevant at which point of signal path the measurement of the RF energy is carried out. If the measurement is carried out further along the downstream signal path, for example at the downstream signal output of the diplex filter, switching back to the first upstream frequency band (such as 65/85 MHz) cannot be guaranteed. Let us consider, for example, a situation where the downstream channels on the frequency band above 258 MHz are in use. Thereupon, if the measurement is carried out at the downstream signal output of the diplex filter, the diplex filters of the downstream transmission would filter out the frequencies below 258 MHz and even if the frequency band of the downstream transmission is changed at the headend, it could not be measured at the frequency band of 100-258 MHz.

According to an embodiment, the network element further comprises a directional coupler connected between said input and said at least two diplex filters, wherein the control circuit is configured to measure the energy of radio frequency signals below said second downstream frequency band at said directional coupler. Thus, by carrying out the measurement at the directional coupler connected between said input and said at least two diplex filters, the filtering effect of the diplex filter for the downstream signals can be avoided.

Nevertheless, there still remains the problem that at the input, as well as at the directional coupler, the level of the downstream signals is low, since they have not yet passed the amplification within the network element. On the other hand, the level of the upstream signals at the directional coupler is high, since they have already passed the amplification within the network element. The level of the upstream signals may be 40 dB more that the level of the downstream signals. The isolation of the directional coupler is insufficient for such magnitude difference and distinguishing the low-level downstream signals from the high-level upstream signals in such situation would require complex bandpass filtering circuitry or a tuner-based measurement.

According to an embodiment, the control circuit is configured to attenuate or turn off amplification of the upstream signals in the network element. As a result, the level of the upstream signal drops to such level that they do not disturb the measurement any more. This allows to the measurement to be implemented with a very simple circuitry, such as using a bandpass/low pass filter and a diode detector.

According to an embodiment, the control circuit is configured to turn off said amplification for a first predetermined period, such as less than 100 ms. Thus, the amplification of the upstream signals is turned off for such a short period that the reception of the upstream signals is not affected. The period may, for example, be several tens of milliseconds, preferably less than 100 ms. Alternatively, instead of the amplification, the upstream signal may be switched off for said period.

According to an embodiment, the control circuit is configured to turn off said amplification upon booting of the network element, and optionally repeatedly after a second predetermined period. Hence, the control circuit may be configured to carry out the measurement automatically upon starting the network element or if otherwise booted. While in operation, the control circuit may be configured to carry out the measurement periodically, and for that purpose, turn off the amplification. The measurement may be carried out, for example, one or more times a day, e.g. every N hours, where N=1, 2, . . . , 24.

According to an embodiment, the network element is configured to adjust one or more of its operational parameters in accordance with the selected upstream frequency band. One example of the operational parameters is the amplification of the upstream signal. According to an embodiment, the network element may comprise a plurality of predefined settings stored in the network element for adjusting its operational parameters, such as the amplification of the upstream signal, in accordance with the selected upstream frequency band, whereupon the operational parameters are adjusted automatically in response to selecting another diplex filter. According to another embodiment, the one or more operational parameters may be adjusted, e.g. calculated, on the basis of the previous parameter values upon switching to the new upstream frequency band.

Figure 2:
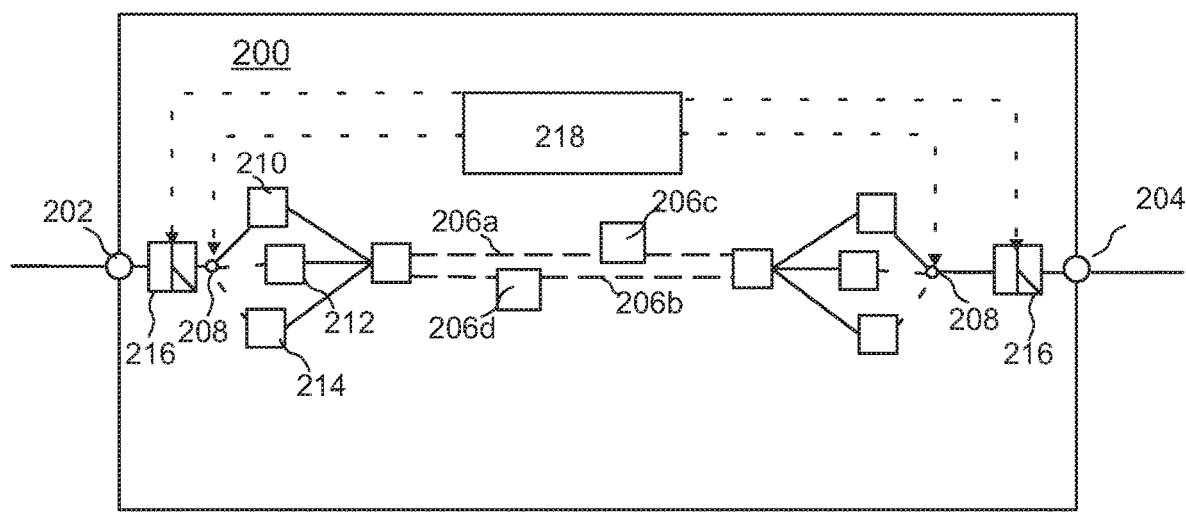
FIG. 2 shows a simplified block chart of a network element according to an embodiment of the invention.

FIG. 2 shows a simplified block chart of a network element, wherein the embodiments may be implemented. In FIG. 2, an amplifier is used as an example of the network element, but the embodiments are similarly applicable to any network elements requiring the adjustment of the upstream frequency band and residing between the headend or the CMTS and the cable modems or other home premise devices, such as various optical nodes and NIUs.

The amplifier 200 comprises a first input/output port 202, which operates as an input for the downstream signals originating from the headend or the CMTS and an output for the upstream signals originating from the customer devices. The amplifier 200 further comprises a second input/output port 204, which operates as an output for the downstream signals originating from the headend or the CMTS and an input for the upstream signals originating from the customer devices. Within the amplifier the downstream and upstream signals have their own signal routes 206a, 206b travelling at least partly through different components, including attenuators, signal inclination controllers, amplifiers, etc. Most of the internal structure of the network element is irrelevant for the implementation of the embodiments, and therefore the internal structure is not described in further detail, but only depicted by the dotted lines 206a, 206b referring to the signal routes and components 206c, 206d referring to the components along the corresponding signal routes.

Regarding the first input/output port 202 and the downstream signals originating from the headend or the CMTS, there is a switch 208 for directing the downstream signals to one of a plurality of diplex filters. The diplex filters also provide a bandpass for upstream signals. The amplifier comprises a first diplex filter 210 arranged to provide the first (existing) upstream frequency band (an upper frequency edge of 42 Mhz, 65 MHz or 85 MHz, for example). The amplifier further comprises a second diplex filter 212 arranged to provide the second higher upstream frequency band (an upper frequency edge of 85 MHz, 117 MHz or 204 MHz, for example). The amplifier may further comprise a third (or even a fourth) diplex filter 214 arranged to provide the third (or fourth) upstream frequency band, wherein the upper frequency edge is one of 85, 117 or 204 MHz and not provided by the second (or the third) diplex filter.

Between the first input/output port 202 and the switch 208, there is a directional coupler 216 provided with a detector circuit (not shown in FIG. 2) for detecting or measuring the energy of the RF signals at least directly above said second upstream frequency band.

The amplifier comprises a control circuit 218, implemented for example as a FPGA or an ASIC and comprising a processor for executing various tasks. The control circuit 218 is configured to obtain the results of the measurement from the detector circuit. The control circuit 218 is also configured to turn off the amplification of the upstream signal for the period of carrying out the measurement. On the basis of the measurement, the control circuit 218, more precisely the processor, controls the switch 208 to select the desired diplex filter.

From the selected diplex filter, the upstream signal is directed back to the upstream signal route and its corresponding components. It is noted that in case that the upstream and downstream signals use the same nodes as input/output ports, as shown in FIG. 2, a similar but a mirrored (in upstream signal route direction) arrangement of a plurality of diplex filter and a switch shall be provided in connection with the second input/output port 204. The control circuit 218 shall then control both switches to select the corresponding diplex filters.

The control circuit 218 may also adjust other parameters of the amplifier to be more optimal in view of the selected upstream frequency band. For example, if the components 206c, 206d along the upstream and downstream signal routes were amplification units, the control circuit 218 may adjust the amplification of at least the upstream signal, but possibly also the amplification of the downstream signal.

Figure 3:
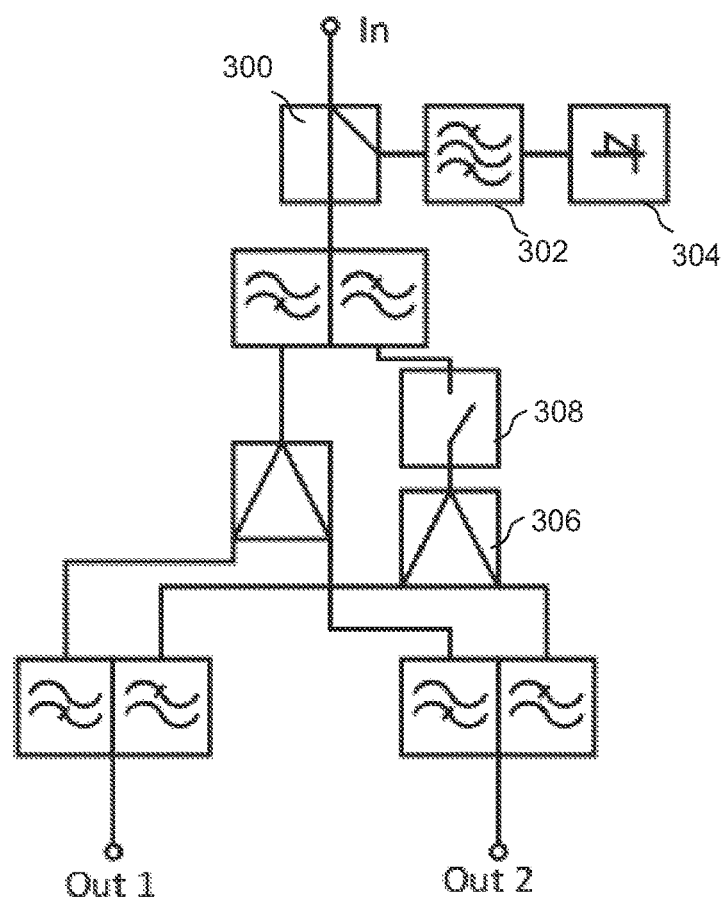
FIG. 3 shows a simplified block chart for measuring the energy of the RF signals according to an embodiment of the invention.

FIG. 3 shows a simplified block chart for illustrating the detector circuit and the arrangement for measuring the energy of the RF signals below said second downstream frequency band. The detector circuit obtains the RF signal from a directional coupler 300, and the detector circuit may comprise, for example, a bandpass filter 302 having a suitable passband, such as 100-258 MHz, and a RF power detector 304, such as a diode detector. The RF power detector may be configured, for example, to detect whether the energy of the RF signals exceeds the threshold value or not, and transmit this information to the control circuit. For the period of carrying out the measurement, the amplification 306 of the upstream path is turned off or the upstream signal is switched off, as shown in block 308. Thus, the RF signal obtained from the directional coupler 300 comprises mainly or only downstream signals. It is noted that FIG. 3 does not disclose the switch for selecting one of a plurality of diplex filters to be used or any amplification for the upstream or downstream direction. On the other hand, the number of output may be more than two.

In general, the various embodiments may be implemented in hardware or special purpose circuits or any combination thereof. While various embodiments may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A skilled person appreciates that any of the embodiments described above may be implemented as a combination with one or more of the other embodiments, unless there is explicitly or implicitly stated that certain embodiments are only alternatives to each other.

The various embodiments can be implemented with the help of computer program code that resides in a memory and causes the relevant apparatuses to carry out the invention. Thus, the implementation may include a computer readable storage medium stored with code thereon for use by an apparatus, such as the network element, which when executed by a processor, causes the apparatus to perform the various embodiments or a subset of them. Additionally or alternatively, the implementation may include a computer program embodied on a non-transitory computer readable medium, the computer program comprising instructions causing, when executed on at least one processor, at least one apparatus to apparatus to perform the various embodiments or a subset of them. For example, an apparatus may comprise circuitry and electronics for handling, receiving and transmitting data, computer program code in a memory, and a processor that, when running the computer program code, causes the apparatus to carry out the features of an embodiment.

It will be obvious for a person skilled in the art that with technological developments, the basic idea of the invention can be implemented in a variety of ways. Thus, the invention and its embodiments are not limited to the above-described examples but they may vary within the scope of the claims.

The invention claimed is:

1. A network element of a cable television (CATV) network, said network element comprising:
    an input for signal transmission;
    at least two diplex filters configured to be connected to said input, a first diplex filter comprising bandpass filters for a first upstream and downstream frequency bands and a second diplex filter comprising bandpass filters for a second upstream and downstream frequency bands, wherein an upper frequency edge of the second upstream frequency band is higher than an upper frequency edge of the first upstream frequency band and higher than or equal to a lower frequency edge of the first downstream frequency band and a lower frequency edge of the second downstream frequency band is higher than the upper frequency edge of the second upstream frequency band;
    a directional coupler connected between said input and said at least two diplex filters;
    a control circuit for measuring energy of radio frequency signals below said second downstream frequency band at said directional coupler, wherein the control circuit is element; and
    a switch for connecting one of said at least two diplex filters to said input,
    wherein said control circuit is configured to control the switch to connect the first diplex filter to said input in response to the energy of radio frequency signals below said second downstream frequency band exceeding a threshold value; or connect the second diplex filter to said input in response to the energy of radio frequency signals below said second downstream frequency band at most reaching the threshold value.

2. The network element according to claim 1, wherein the upper frequency edge of the first upstream frequency band is 42 or 65 or 85 MHz and the upper frequency edge of the second higher upstream frequency band is at least one of 85 MHz, 117 MHz or 204 MHz.

3. The network element according to claim 2, wherein the energy of radio frequency signals is configured to be measured at a frequency band between a lower frequency edge of the first downstream frequency band and the lower frequency edge of the second downstream frequency band, or a sub-band thereof.

4. The network element according to claim 3, wherein the control circuit comprises a bandpass filter for a frequency band of 100-258 MHz, or a sub-band thereof.

5. The network element according to claim 1, wherein the control circuit is configured to turn off said amplification or switch off the upstream signals for a first predetermined period.

6. The network element according to claim 1, wherein the control circuit is configured to turn off said amplification upon booting of the network element, and optionally repeatedly after a second predetermined period.

* * * * *